H. J. HUGHEY.
ANIMAL TRAP.
APPLICATION FILED JUNE 7, 1921.
1,424,307.
Patented Aug. 1, 1922.
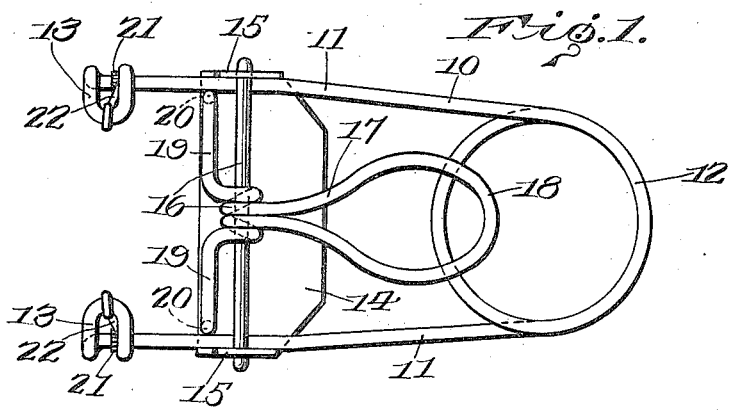
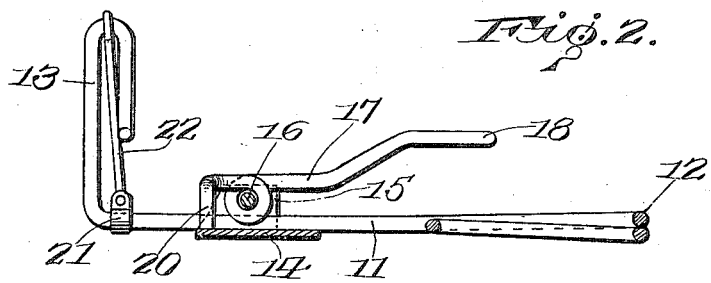
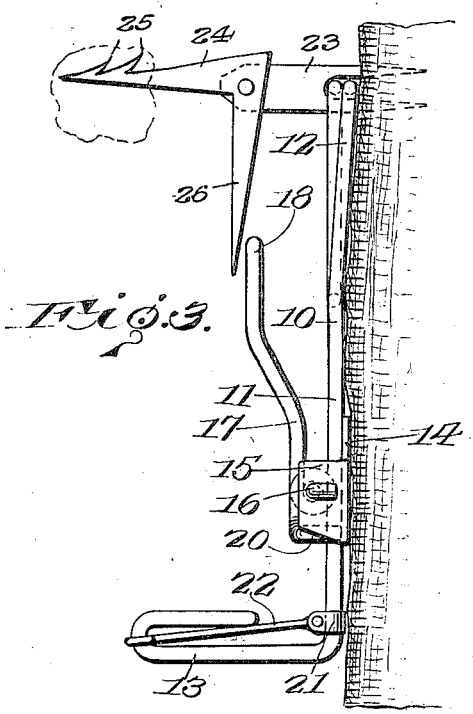
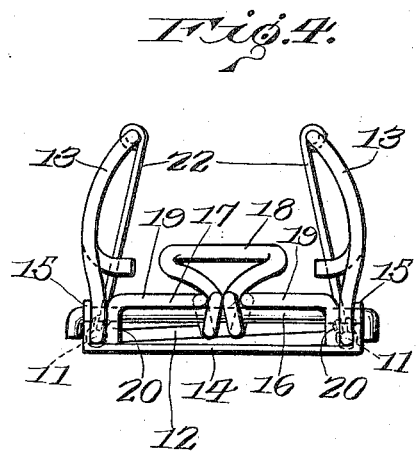
Inventor
Henry J. Hughey,
Attorneys

UNITED STATES PATENT OFFICE.

HENRY JAMES HUGHEY, OF JACKMAN, MAINE.

ANIMAL TRAP.

1,424,307.　　　　Specification of Letters Patent.　　Patented Aug. 1, 1922.

Application filed June 7, 1921. Serial No. 475,670.

*To all whom it may concern:*

Be it known that I, HENRY JAMES HUGHEY, a citizen of the United States, residing at Jackman, in the county of Somerset, State of Maine, have invented certain new and useful Improvements in Animal Traps; and I do hereby declare the following to be a full, clear, and exact description of the invention, such as will enable others skilled in the art to which it appertains to make and use the same.

This invention relates to new and useful improvements in traps and particularly to animal traps.

One object of the invention is to provide a trap which will be effective in killing and holding the game, and which can be easily and quickly set without danger to the operator.

Another object is to provide a trap of this character which can be regulated to operate with a light pressure, for use in catching small animals.

Other objects and advantages will be apparent from the following description when taken in connection with the accompanying drawing.

In the drawing:

Figure 1 is a top plan view of a trap made in accordance with the invention, the trap being shown in set position.

Figure 2 is a vertical longitudinal sectional view through the trap spreader being shown in elevation.

Figure 3 is a side elevation of the trap, applied to a tree and showing the combined holder for the bait and releasing device.

Figure 4 is an end view looking into the jaws of the trap.

Referring particularly to the accompanying drawing, 10 represents a stiff wire yoke which includes the arms 11, connected at one end by the integral coil 12, and having the other ends bent upwardly and thence downwardly, to form the jaws 13, said jaws being bowed outwardly away from each other, as clearly seen in the end view Figure 4.

Mounted on the bars, inwardly of the jaws 13, is a plate 14 having its ends turned upwardly and apertured, as shown at 15, to rotatably support the shaft 16. Pivotally supported on the shaft 16 is a lever 17 having one end formed into a loop 18, which extends between the arms 11, between the plate and the coils 12, and serves as the bait holder. The other end of the lever 17 has two horizontal and oppositely extending arms 19, the extremities of which are turned downwardly, as shown at 20, for engagement with the inner faces of the arms 11, to hold the said arms, and the jaws thereof, outwardly, against the tension of the spring coils 12.

When an animal rocks the lever 17, by attempting to remove the bait from the holder, the portions 20 will be released from the arms 11, resulting in the coils 12 suddenly swinging the said arms, and the jaws 13 inwardly to grip the animal.

Carried by each arm 11 adjacent a jaw 13, is a clip 21, and connected to the upper portion of each jaw, and depending therefrom, with its lower end detachably connected to the clip, is a bar 22, which in effect is the chord of the arc of the jaw, and serves to permit the jaw to grip smaller animals than the full open position of the jaws.

A double-pronged member 23 is provided to straddle the coils 12, of the yoke 10, and to be driven into the trunk or limb of a tree, when the device is used for the purpose of trapping small animals which seek refuge or live in trees, such as the squirrel.

Pivotally supported on the outer end of the member 23 is an angle lever, the arm 24 of which normally extends horizontally away from the tree and is provided with barbs 25 for holding the bait, the other arm 24' depending in position to move inwardly against the loop 18, when the lever is rocked to release the jaws.

What is claimed is:

1. A trap comprising a plate having its ends upturned and apertured, a shaft supported in the upturned ends of the plate, a lever mounted on the shaft and having downwardly turned end portions, and a spring member including a pair of resilient arms connected at one end by spring coils formed integrally therewith, the other ends of the arms being angularly turned and outwardly bowed to provide gripping jaws, said arms being arranged to be engaged and held under tension by the downwardly turned portions of the lever.

2. A trap comprising outwardly bowed spring jaws, means for holding the jaws in separated position at times, and means for attachment to each of the spring jaws at a position co-incident with the chord of the arc thereof to permit the jaws to grip a smaller animal therebetween.

3. The combination with a trap having a base and a movable trip, of means for anchoring the base, and means movably carried by the anchoring means for holding bait and arranged to engage and move the trip.

4. The combination with a trap having a base and a movable trip, of an anchoring means for the trap including a support attaching member disposed in embracing relation to a portion of the base of the trap, and an angle lever pivoted on the attaching member and having one of its arms formed to support bait and its other arm arranged to release the said trip.

In testimony whereof, I affix my signature, in the presence of two witnesses.

HENRY HUGHEY.

Witnesses:
CHESTER H. MILLS,
FLOREAN DUGAL.